United States Patent [19]
Land

[11] 3,848,979

[45] Nov. 19, 1974

[54] SELF-CLEANING PHOTOGRAPHIC TRANSPARENCY PROCESSING AND PROJECTION SYSTEM

[75] Inventor: Edwin H. Land, Cambridge, Mass.

[73] Assignee: Polaroid Corporation, Cambridge, Mass.

[22] Filed: Oct. 31, 1973

[21] Appl. No.: 411,314

Related U.S. Application Data

[62] Division of Ser. No. 261,153, June 9, 1972.

[52] U.S. Cl. .............................. 352/78 R, 352/130
[51] Int. Cl. ............................................ G03b 23/02
[58] Field of Search .............. 352/78 R, 130, 78 C; 354/317; 15/210 R; 274/44

[56] References Cited
UNITED STATES PATENTS

| | | | |
|---|---|---|---|
| 2,606,409 | 8/1952 | Gordon | 274/47 |
| 2,992,447 | 7/1961 | Hicks | 15/210 R |
| 3,293,682 | 12/1966 | Giles | 15/210 R |
| 3,514,047 | 5/1970 | Mallie et al. | 15/210 R X |
| 3,778,140 | 12/1973 | Land | 352/78 X |
| 3,785,725 | 1/1974 | Batler, Jr. | 352/78 R |
| 3,789,452 | 2/1974 | Nemoto | 15/210 R |

Primary Examiner—Fred L. Braun
Assistant Examiner—E. M. O'Connor
Attorney, Agent, or Firm—John W. Ericson

[57] ABSTRACT

A photographic system, comprising a film cassette having a strip of film extending through a film gate, a supply of processing composition, and a processor for applying the processing composition to the film upon manipulation of the film in the cassette; and a film drive and projection system adapted to receive the cassette, having an aperture plate adapted to mate with the film gate, and comprising a mechanism for manipulating the film to cause processing, and an absorbent pad on the film strip in position to engage the aperture plate and clean it after the film has been processed.

3 Claims, 11 Drawing Figures

PATENTED NOV 19 1974
3,848,979
SHEET 1 OF 3
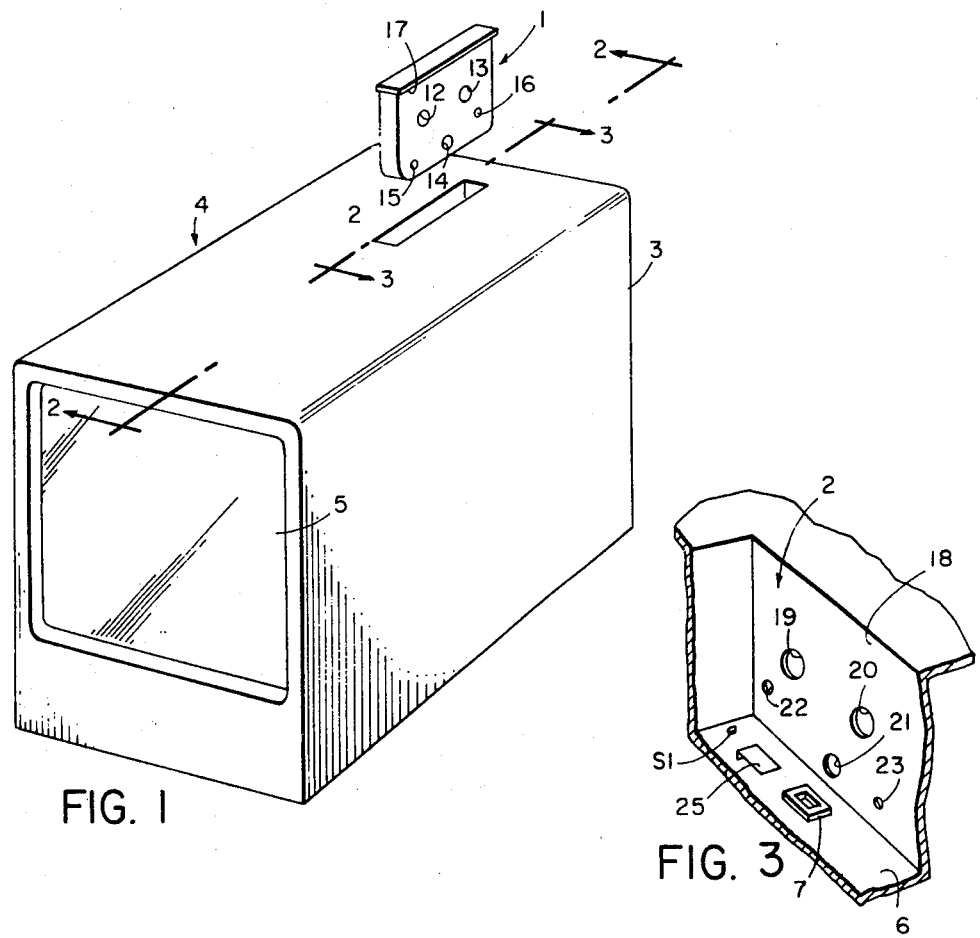
FIG. 1
FIG. 3
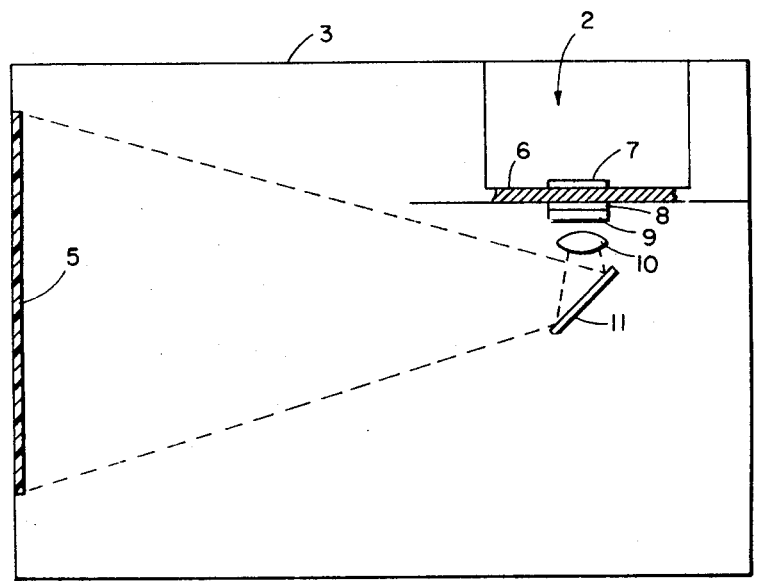
FIG. 2

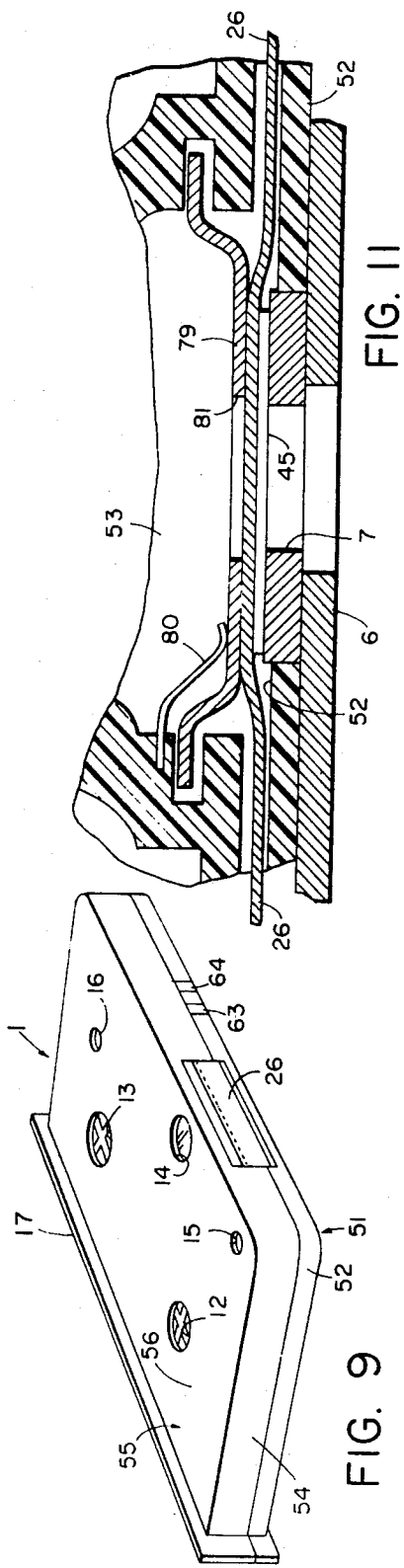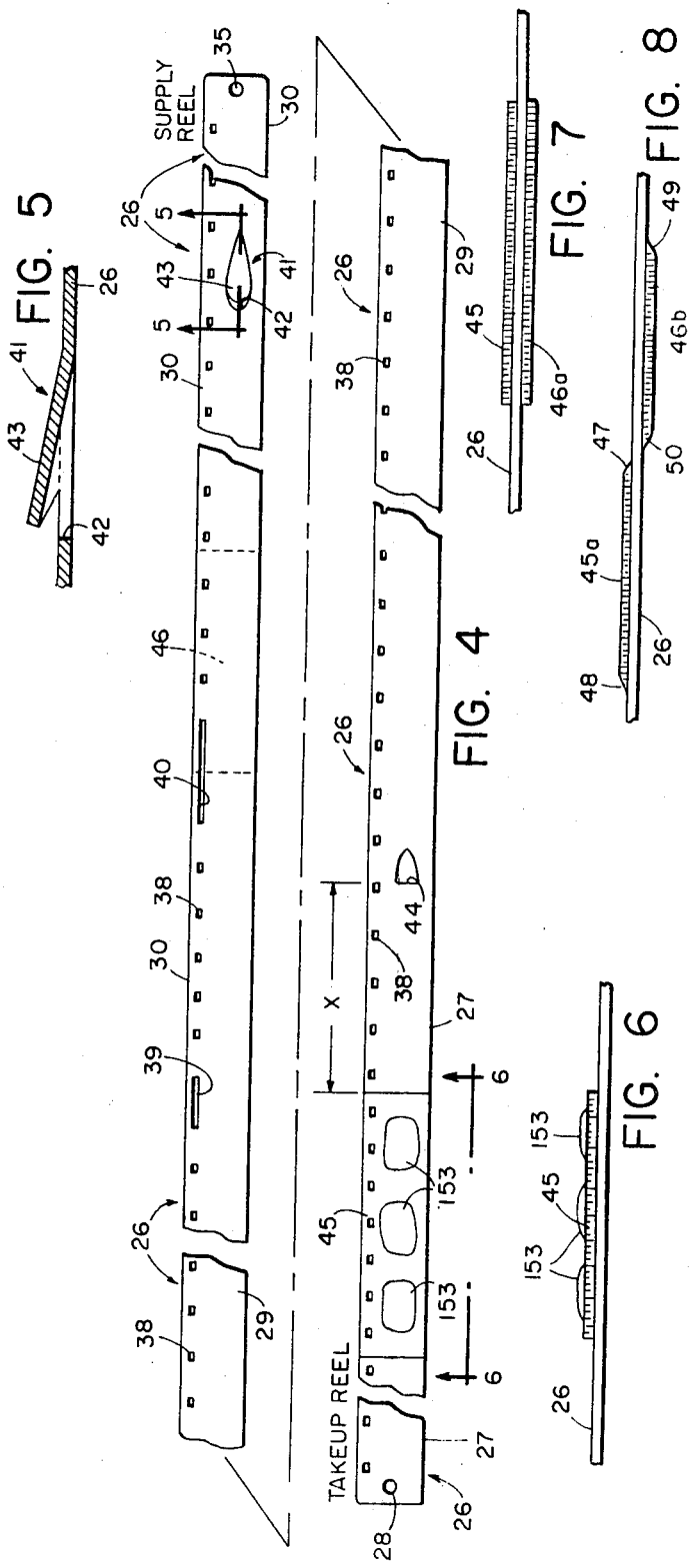

3,848,979

SELF-CLEANING PHOTOGRAPHIC TRANSPARENCY PROCESSING AND PROJECTION SYSTEM

This is a division of application Ser. No. 261,153, filed June 9, 1972.

This invention relates to photography, and particularly to a novel self-cleaning system for processing and projecting transparencies.

A recent advance in photography has been the creation of systems, especially useful for the production of motion pictures, in which the film in a cassette containing a film processor is exposed, and then processed and projected in apparatus which manipulates the film to actuate the processor. Such a system is disclosed in U.S. Application for Letters Patent Ser. No. 227,080, filed on Feb. 17, 1972 by Edwin H. Land for Photographic System for Processing and Projecting Transparencies, and assigned to the assignee of this application.

In the system described in the above-cited application, an initially sealed container of processing composition is opened, and then coated on the film as the film is wound onto a reel. The amount of processing composition is selected to be exhausted at the end of the coating process. Usually, all of the composition is applied to the film, and dries on the film; the drying process is aided by projection of the film, with some attendant heating by the projection lamp, immediately after processing. However, an occasional drop or so of processing composition may find its way onto elements of the system other than the film.

There is a spring biased pressure plate in the cassette, which engages the emulsion side of the film in the region of a film gate through which the film passes for exposure and projection. Should processing composition get onto this plate, it could cause spots, smears or swelling of the emulsion on film coming into contact with the plate behind the film from which the composition was deposited, or it might dry while the film was motionless, and cause sticking of the film.

Another potentially troublesome area is the aperture plate in the film drive and projection system. The aperture plate is a generally rectangular block adapted to register with the film gate in a cassette and to engage the film; it is formed with a framing aperture that defines the optical boundaries of the projected frame. Either an occasional drop of processing composition, or particles of lint or dust, deposited by cassettes on this plate would be particularly troublesome. Any problems caused in a cassette by its own leakage tend to be minor and self-limiting; however, even minor contaminations of the aperture plate by each of a succession of cassettes are cumulative.

It would manifestly be desirable to inhibit both the self contamination of cassettes, and the progressive contamination of the aperture plate by cassettes, in systems of the kind here described. The object of this invention is to minimize the effects of such contamination, without making extensive modifications of the apparatus or requiring onerous manual cleaning procedures.

The above and other objects of the invention are attained by attaching one or more pads of relatively soft, absorbent and preferably brush-like material to a film strip otherwise adapted for use in a system of the kind shown and described in the above-cited copending application Ser. No. 227,080. In accordance with a presently preferred embodiment of the invention, only one such pad is employed, and that is placed on the non-emulsion side of the film and used to clean the aperture plate in the film drive and projection system just before the cassette is ejected. However, as will appear, it is within the scope of the invention in its broader aspects to employ an additional pad, on the emulsion side of the film, to clean the pressure plate in the cassette after the film is projected, or to employ more than one pad for either or both purposes.

In the transparency processing and projection system described in the above-cited copending application Ser. No. 227,080, a cassette containing exposed but unprocessed film is carried through a sequence of four operational stages. First, the film is advanced, in the direction in which it was advanced between exposures in the camera, to a point beyond the exposure termination point. This process has two significant advantages, and is used to perform an enabling step in the film processing operation. One advantage is that the processing composition is always applied to the same length of film, even though the film may have been removed from the camera before all of it was exposed. That makes it possible to use up all of the processing composition supplied with the cassette by applying it to the film, thus minimizing the chances of leakage. Secondly, the construction of the film drive and projection system is simplified because the basic operational cycle of advancing and then rewinding the film is the same whether the film is initially processed or unprocessed; for unprocessed film, as will appear, this basic cycle is simply repeated.

As fully described in the above-cited copending application Ser. No. 227,080, processing composition is applied to the film as it is rewound after the advance movement just described. During this process, the film is engaged by coating apparatus, which imposes a drag on the drive mechanism. This mechanism includes slip clutches, and the slipping of these clutches provides signals used to advance the system to its next operational phase. Accordingly, it is undesirable to impose any additional drag on the film during the coating operation.

The processing operation is terminated when an aperture in the film engages a cam and valve member forming a part of the processor and moves it into a latched position in which the coating elements of the processor are disengaged from the film. The film cannot move beyond the final position of the cam and valve member until it is disengaged from that member when the film is advanced for projection; accordingly, a clutch in the drive mechanism slips at that point, and a signal is produced that causes the advance for projection to begin.

In accordance with the invention, the aperture plate cleaning pad is mounted on the film in a location that will not encounter the aperture plate during the operations described above. The reason is that proper operation of the cleaning pad necessarily requires the application of a drag force to the film which might interfere with the operation of the system during processing.

In particular, the cleaning pad is preferably located on the leader of the film far enough from the aperture that ends the processing cycle so that it will not engage the aperture plate when rewinding of the film is terminated by engagement of the film aperture with the cam and valve member in the final position of the cam and valve member.

During the final rewinding operation, which takes place after the film has been projected, the film aperture passes the cam and valve member with clearance, and rewind does not terminate until the end of the film is reached. During that additional rewinding movement, the cleaning pad encounters the aperture plate, removing any stray processing composition, or other foreign matter such as lint or dust or the like, just before the cassette is ejected. The cleaning operation is repeated each time the cassette is returned to the film drive and projection system for projection and rewinding, so that in normal use the aperture plate is cleaned frequently relative to the times when it is subjected to possible contamination by processing composition.

The apparatus of the invention, and its mode of operation, will best be understood in the light of the following detailed description, together with the accompanying drawings, of various illustrative embodiments of the invention.

IN THE DRAWINGS,

FIG. 1 is a schematic perspective sketch of a film cassette shown in association with a film drive and projection system adapted to embody the invention;

FIG. 2 is a schematic elevational view, with parts shown in cross section and parts broken away, of the film drive and projection system of FIG. 1, taken substantially along the lines 2—2 in FIG. 1;

FIG. 3 is a schematic fragmentary perspective sketch of a portion of a cassette receiving receptacle in the film drive and projection system of FIG. 1, taken substantially along the lines 3—3 in FIG. 1;

FIG. 4 is a fragmentary schematic plan sketch, with parts broken away, of a film strip in accordance with the invention and forming a part of the cassette of FIG. 1;

FIG. 5 is a fragmentary schematic cross-sectional view of a portion of the film strip of FIG. 4, taken essentially along the lines 5—5 in FIG. 4; FIG. 6 is a fragmentary schematic elevational view of a portion of the film strip of FIG. 4, taken essentially along the lines 6—6 in FIG. 4;

FIG. 7 is a fragmentary schematic elevational view of a portion of a film strip in accordance with a modification of the invention;

FIG. 8 is a fragmentary schematic elevational view of a portion of a film strip in accordance with another modification of the invention;

FIG. 9 is a schematic perspective sketch of a cassette adapted for use in accordance with the invention;

Figure 10:
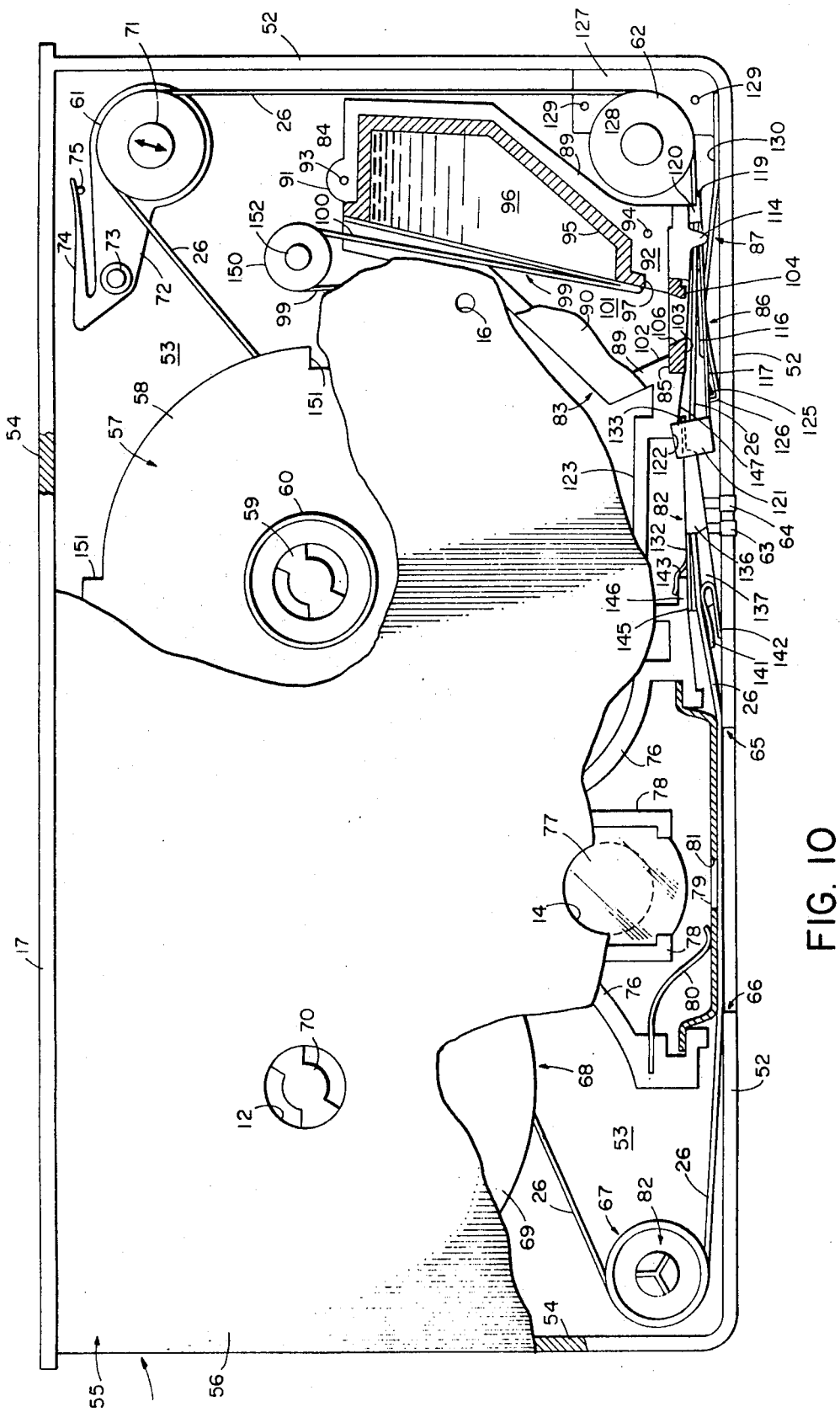

FIG. 10 is a schematic plan sketch, with parts omitted, parts shown in cross section, and parts broken away, of a film cassette adapted for use in accordance with the invention; and FIG. 11 is a fragmentary schematic elevational sketch of a portion of the film drive and projection system of FIG. 1 shown in association with a portion of the cassette of FIG. 1, with parts omitted, parts shown in cross section, and parts broken away.

FIG. 1 shows the external cooperative aspects of a system adapted to embody the invention. Except in the particular respects to be described, the system may be identical with that shown and described in the above-cited copending application Ser. No. 227,080, to which reference is made for a detailed description. Accordingly, the system will be here described only to the extent necessary for an understanding of the invention.

The basic elements of this system are a cassette 1, adapted to be inserted in a pocket 2 formed in the outer housing 3 of a film drive and projection system generally designated 4. A strip of film in the cassette has ends connected to supply and takeup reels rotatably mounted in the housing of the cassette to move the film back and forth through a film gate in the housing, as will appear. A translucent viewing screen 5, on which projected images at times appear, is mounted at the front of the housing 3.

As best shown in FIG. 2, the pocket 2 has a floor 6 on which an aperture plate 7 is mounted. The aperture plate 7 is adapted to extend into the cassette such as 1 and there register with the film in the cassette. Light supplied in a manner to be described passes through the film, and thence over a path traversing a suitable framing aperture in the aperture plate 7, a cooperating recess in the floor 6, a blinder housing 8, and a conventional shutter 9, to a lens 10. As described in the above-cited copending application Ser. No. 227,080, the blinder housing receives a blinder that serves at times to close the optical path through the aperture in the aperture plate 7 and thereby assist in providing a light-tight environment for the film in the cassette, while it is being processed. The lens focuses an image of the portion of the film selected by the framing aperture on a mirror 11, whence it is reflected to the screen 5.

As shown in FIG. 1, the cassette 1 is provided with a number of light-baffled openings, 12, 13, 14, 15 and 16. These openings expose parts adapted to cooperate with corresponding parts of the film drive and projection system to perform various functions in the cassette. Thus, a sprocket formed on the takeup reel mentioned above is accessible through the opening 12. A similar drive sprocket formed on the supply reel is accessible through the opening 13. Projection light is at times admitted to the cassette through the opening 14. A stop can enter, to brake a snubber roll forming a part of the cassette, through the opening 15. The opening 16 serves to admit a locating pin, forming a part of the film drive and projection system, to register the presence of a cassette in the system and to enable the processing apparatus in a manner described in detail in the above-cited copending application Ser. No. 227,080.

A flange 17 is formed on the upper end of the cassette 1. This flange aids in grasping the cassette while inserting it in, or removing it from, the pocket 2. It also helps to fix the cassette in position in the film drive and projection system, by engagement with the rim of the pocket 2.

Referring to FIG. 3, parts adapted to enter the openings in the cassette 1 are adapted to enter the pocket 2 through corresponding openings in a side wall 18 of the pocket. Drive sprockets for the supply and takeup reels are adapted to enter through openings 19 and 20, respectively. A light beam for projection enters through an opening 21. The locating pin enters through an opening 22. The snubber roll stop enters through an opening 23.

In addition to the aperture plate 7 described above, the actuating arm 24 of a normally closed switch S1 is movably mounted on the floor plate 6. This switch is adapted to be opened when a cassette is inserted in the pocket 2, to interrupt a restoring circuit that resets the apparatus to its standby condition if it is inadvertently started without a cassette in the pocket, as described in the above-cited copending application Ser. No. 227,080.

A foot pedal 25 is movably mounted in the pocket 2 to be depressed by the insertion of a cassette. The foot pedal is connected to an actuating arm extending through the floor plate 6, to release the locating pin as described in the above-cited application Ser. No. 227,080.

The photographic system of the invention preferably makes use of a photofinishing process in which a strip of film, following exposure in the camera, is contacted with a single processing composition to form a finished transparency from the latent image or images formed on the film during its exposure. The physical construction of such film, the nature of the photosensitive coating thereon, and suitable processing compositions therefor, are described in the above-cited copending application Ser. No. 227,080. However, the physical construction of the film strip is modified in accordance with the invention in a manner next to be described.

Referring to FIG. 4, there is shown a film strip generally designated 26, which comprises a leader 27 terminating at an end formed with an aperture such as 28. The aperture 28 serves to connect that end of the film to a takeup reel, to be described.

Behind the leader, which may be in the neighborhood of 18 inches in length, there is a strip 29 of photographically useful film, upon which projectable images may be formed. The strip 29 may be, for example, approximately 52 feet in length for 8 mm film.

Following the photographically useful portion of the film is a trailer region generally designated 30. The trailer 30 terminates at another end formed with an aperture 35 by means of which that end of the film is adapted to be connected to a supply reel, to be described.

The film 26 may comprise a base of any suitable transparent material of the kind conventionally used for film bases. On this base is applied, at least over the central portion of the photographically usable length of the film 29, an emulsion comprising a photosensitive coating, whereon a series of latent images may be formed with a camera. The photosensitive coating is preferably of one of the forms, described in the above-cited copending application Ser. No. 227,080, which can subsequently be processed to form a projectable image on the film base.

It should be noted that the invention is not directed to the chemistry by which images are developed in a photosensitive emulsion and transferred to an image receiving stratum. However, in the practice of the invention, whether the film employed is black and white or color film, at the present time the preferred embodiment of the invention employs film of a type not requiring the removal of a negative emulsion after it is developed.

Referring again to FIG. 4, the film 26 is formed along one edge with sprocket holes such as 38 at regular intervals adapted to cooperate with a drive pawl, in a manner to be described, in either camera or projector, for incremental advancement of the film. The series of sprocket holes 38 adjacent the trailing end of the film may be interrupted by a first elongated sprocket hole 39. This elongated hole 39 may span, for example, two of the sprocket holes 38.

Further along the film in the direction of the supply reel end, the series of sprocket holes 38 is again interrupted by a second elongated sprocket hole 40, longer than the sprocket hole 39 and, for example, spanning three of the sprocket holes 38. As will appear, the first elongated sprocket hole 39 establishes an exposure end point in the camera, whereas the second sprocket hole 40 determines a film takeup termination point in the film drive and projection apparatus to be described.

Basically, termination of film advance at the first elongated sprocket hole 39 is attained by the use of a single drive pawl in the camera, which sequentially engages the sprocket holes 38 to advance the film by one frame length in a conventional manner. Toward the end of each such advance stroke, as is conventional, the pawl is cammed down out of engagement with the film. When the single pawl engages the elongated aperture 39, the camming down movement occurs before the film engages the leading edge of the elongated hole, and therefore the pawl may cycle repeatedly without further advance of the film. This serves to effect a termination of film advance for the purposes of exposure adjacent the end of the region of photographically useful emulsion, to alert the photographer, by the somewhat different sound produced when the pawl skips the film, that his cassette should be replaced.

The film drive and projection system is provided with a double pawl, comprising two integral pawls spaced apart by one frame length, each pawl being of the same shape as the single pawl in the camera. When the first elongated aperture 39 is encountered, the trailing pawl of the pair serves to engage the leading edge of the aperture 39 to cause the film to be advanced without interruption. For normally spaced sprocket holes 38, both of the pawls engage the film in sequential sprocket holes. However, when the second elongated sprocket hole 40 is encountered, the pawls will pass through it without film engagement, and thereby terminate film advance in the same manner as did the single pawl upon engagement of the double length sprocket hole 39.

Formed on the trailing end 30 of the film 26, beyond the exposure advance termination portion just described in the direction of the supply reel end of the film 26, is a singularity generally designated 41 comprising a detent engaging element here shown as an aperture 42 formed in the film, adjacent which a projecting bump 43 is formed, as by pressure, heat and pressure, or the like. As best shown in FIG. 5, the singularity 41 thus comprises a hook adapted to engage the detent in the form of a process control actuating element, to be described, as the film is moved with respect to the detent in the direction of the takeup reel.

The bump 43 forming a part of the detent engaging assembly 41 in FIG. 4 projects from the film, and might be deformed, or might cause pressure marks on other parts of the film, as it is wound on the reel. To avoid that result, it is preferred to provide suitable pockets, not shown, comprising apertures formed in the trailing end 30 of the film, and spaced at suitable intervals with respect to the radius of the supply reel spool to receive the projection 43 as the film is wound onto the reel. This provision allows the film to be evenly wound on the spool, without deformation of the bump.

Formed on the leader end 27 of the film 26 is another detent engaging means, here shown as an aperture 44 in the central region of the film. This aperture serves to actuate a valve member forming a part of the processing apparatus to be described, for purposes to appear.

As shown in FIGS. 4 and 6, an aperture plate cleaning pad 45 is secured to the non-emulsion side of the film strip 26 on the film leader 27, between the apertures 28 and 44. The paid 45 may be cemented to the film, and may be of any suitable absorbent, resilient and preferably brush-like material, such as any conventional flocked fabric of natural or synthetic fibers. In order to enter and engage the edges of the aperture in the plate 7, the pad 45 may be formed with one or more raised portions 153, as by embossing under pressure, or the like.

The length of the pad 45 is preferably selected to be somewhat less than the circumference of the film on the takeup reel in the region on which it is wound, in order to allow the balance of the film strip to be wound evenly on the reel. The pad 45 is preferably located at a distance X from the aperture 44 selected to cause the pad to stop short of the film gate in the cassette, to be described, when film movement toward the supply reel is terminated by engagement of the aperture 44 with the valve member in the cassette, to be described. The distance X should also be selected relative to the end of the strip at which the aperture 28 is formed so that the pad 45 will sweep the aperture plate 7 when the film is rewound to the termination point established by the end of the film connected to the takeup reel.

If desired, a pressure plate cleaning pad 46, of the same material as the aperture plate cleaning pad 45, may be secured to the emulsion side of the film in position to clean the aperture plate of the cassette, to be described, immediately following the projection of the film. For that purpose, the pad 46 may be located in the vicinity of the second elongated sprocket hole 40 so that it will enter the film gate and sweep the pressure pad at the end of the projection cycle.

Alternatively, as shown in FIG. 7, the pressure plate cleaning pad 46a may be located on the film 26 opposite the aperture plate cleaning pad 45. By that arrangement, both the pressure plate and the aperture plate will be cleaned as the last step before the cassette is ejected.

The arrangement shown in FIG. 7 gives the maximum brushing pressure for a given thickness of each of the cleaning pads 45 and 46a, but may require undue force for a desired thickness, and therefore fluid absorbing capacity, of the pads. In order to allow more pad thickness for the same film drag, the construction shown in FIG. 8 may be adopted. As there shown, the aperture plate cleaning pad 45a and the pressure plate cleaning pad 46b may be sequentially located on opposite sides of the film 26, with the pad 46b on the emulsion side. The pad 46b should be between the pad 45a and the film aperture 44 in the position of the pad 45 in FIG. 4. The leader of the film should be extended so that both pads will pass through the film gate when the film is rewound after projection. By that arrangement, the pressure plate is first cleaned, and the aperture plate is then cleaned just before the cassette is ejected.

The length of each pad may be the same as the length of the pad 45 in FIG. 4, with allowances so that the remaining film can be smoothly wound in the takeup reel. If desired, the leading and trailing edges of the pads may be tapered to facilitate entry, as shown at 47, 48, 49 and 50 in FIG. 8.

FIGS. 9 and 10 show, in part fragmentarily, and in part schematically, the pertinent elements of an internally programmed cassette 1 adapted for use in the system of the invention. The cassette comprises a housing formed of any suitable opaque material such as metal, plastic, or the like, and preferably manufactured in two cooperating parts.

As shown in FIGS. 9 and 10, the housing parts comprise a base generally designed 51, comprising side walls 52 and a base plate 53. The base plate 53 extends across the base of the wall 52, and comprises one side of the housing. The walls 52 extend at least in part about the periphery of the base plate 53, and cooperate with interfitted walls 54 of a cover generally designated 55. The walls 54 overlap the corresponding segments of the walls 52 to form the sides of the housing of the cassette 1.

A cover plate 56 is formed integral with the walls 48, and completes the upper side of the housing as seen in FIGS. 9 and 10. When the cover is placed in position, it may be formed integral with the base 55 by heat sealing, or by a suitable adhesive, or the like.

The base and cover parts form, when assembled, the end flange 17 that serves to support and locate the cassette 1 in either a camera, or in the film drive and projection system of FIG. 1.

Rotatably disposed within the cassette housing is a supply reel generally designated 57. The reel 57 is provided with an upper flange 58 and a corresponding lower flange, not shown in FIG. 10, to guide the film strip 26 as it is wound about the spool portion of the reel 57, not shown, to which the supply end 30 of the film 26 (FIG. 4) is attached.

A sprocket schematically indicated at 59 may be formed integral with the reel 57 to adapt the reel to be driven about its axis of rotation. Access to the sprocket 59 may be provided through the aperture 13 in the cover plate 50 (FIG. 1), light-baffled by suitable conventional annular flanges formed in cooperating relation on the cover plate 56 and on the upper surface of the flange 58, as at 60. The lower flange of the reel 57 may be formed in a conventional manner with a cylindrical axial opening to receive a cooperating axle, not shown, formed integral with the base plate 53.

Initially, the film 26 is in its unexposed state and coiled primarily about the supply reel 57. It is shown in FIG. 10 in the position assumed as it nears the end of its movement away from the supply reel, as toward the end of exposure in a camera, in which it is nearly exhausted from the reel 57.

In its path from the supply reel 57, the film 26 first encounters a bobulator roll 61. The film engages a portion of the periphery of the bobulator roll, as shown, and passes therefrom around a conventional idler roll 62 journalled for rotation in the housing, and thence through film processing means, to be described below. In addition to the apparatus for processing the film in a manner to be described, the film processing means comprises a signal generator for producing an external condition signal on terminals schematically indicated at 63 and 64, to indicate whether or not the processing means has been actuated.

Beyond its path through the film processing means, the film 26 extends through a conventional light-baffled aperture schematically indicated at 65 and forming a portion of a film gate in the housing. The film 26 reenters the housing through a second light-baffled aperture generally designated 66 and comprising a second portion of the film gate.

The film 26 next passes over a conventional snubber roll, generally designated 67, and finally passes to a takeup reel generally designated 68, comprising a spool portion to which the takeup reel end of the film is connected, and about which the film is wound as suggested in FIG. 10.

In addition to parts corresponding to those parts described in connection with the supply reel 57, the takeup reel comprises an external upper flange 69 protruding beyond the maximum radius of the film 26 when substantially stored on the takeup reel. On the flange 69 is formed a suitable drive sprocket 70, by means of which the film can be selectively advanced in a manner to be described.

The bobulator may be of any conventional construction suitable for the performance of the known function of isolating the film drive pawl associated with the camera, or the pawl associated with the projector, from the inertia of the supply reel 57. However, it is preferably of the form shown, in which the bobulator roll 61 is journalled on a pin 71 for rotation by the film.

The pin 71 is formed integral with a support 72 of plastic or the like. The support 72 is journalled to the base plate 53 by means of a pin 73 formed integral with the base plate, and biased by a spring 74 formed integral with the support 72. The spring 74 acts against a post 75 formed integral with the base plate 53. The bobulator roll 61 can thus both rotate about the pin 71, and move backwards and forwards in the directions of the double arrow shown in FIG. 10.

The bobulator roll responds to increases or decreases in the tension of the film 26 by temporarily shortening or lengthening the film path, respectively. Such changes in film tension are produced by the actuation of the film drive pawl, and are determined by the inertial forces exerted by the supply reel 57, together with the larger or smaller supply of film that may be on it at any given time. By that arrangement, as the film is advanced incrementally by the pawl associated with the camera or projector, it can rapidly move the bobulator roll against the spring 74 without immediately affecting the supply reel, which can then more or less gradually allow the bobulator roll to relax while supplying the segment of film taken by the pawl.

A lighttight shield around the film gate formed by the apertures 75 and 66 is formed by a wall portion 76 formed integral with the base plate 53 and made integral with the cover plate 56 after assembly of the parts in the manner described above. An exposed chamber behind the film 26 is thus formed for the purpose of admitting projection light.

The apparatus for this purpose is conventional, and will only briefly be described. In short, it comprises a prism generally designated 77 and comprising a mirror, not shown, but disposed at 45° to the plane of FIG. 10. As schematically indicated, the prism 77 is mounted between extensions 78 formed on the wall 76.

Light enters the cassette through the port 14 formed in the cover plate 56 in directions normal to the plane of FIG. 10. The mirror in the prism 77 directs this light downwardly through the film 26 in the film gate for the projection of images on the film through the lens 10 (FIG. 2).

Also disposed in the chamber bounded by the wall member 76 and the film passing through the film gate is a conventional pressure plate 79, located between the prism and the film, and biased by a spring 80 into engagement with the film. The spring 80 is supported and retained by suitably shaped extensions of the support wall 76, as shown.

The pressure plate serves in the conventional manner to cooperate with a camera, by locating the focal plane of the film during exposure. An aperture 81 is provided in the pressure plate 79, as schematically indicated, to pass light entering through the prism assembly 77 through a selected frame of the film 26, after the film is processed in a manner to be described. It is preferred that the aperture 81 be somewhat larger than the frame to be projected so that the aperture in the aperture plate 7 (FIGS. 2 and 3) serves as the limiting aperture bounding the projected frame.

The snubber roll 67 may also be of entirely conventional construction. As illustrated, it is provided with a hub portion schematically indicated at 82 that is adapted to protrude through the (suitably light-baffled) aperture 15 in the cover panel 50 for engagement by a stop member, comprising a part of either the camera or of the film drive and projection system, that is engaged when the film is to be incrementally advanced by a pawl for exposure or projection purposes. The cooperation between the snubber roll 67 and the takeup reel 68 is conventional, but will be briefly described.

The drive sprockets 59 and 70 of the supply and takeup reels 57 and 68, respectively, are adapted to be engaged by corresponding drive sprockets comprising a part of a camera, or of the film drive and projection apparatus described in the above-cited copending application Ser. No. 227,080. In the film drive and projection apparatus, both supply and takeup reels are adapted to be driven through slip clutches. In the camera, only a drive for the takeup reel need be provided. This drive comprises a slip clutch connected to a sprocket driving the takeup reel drive sprocket 70, in cooperation with a drive pawl for sequentially engaging a series of the sprocket holes 38 formed in the film 26, along a portion of the edge of the film in the film gate between the apertures 65 and 66.

When the snubber roll 67 is stopped by engagement of the hub 82 as described above, operation of either the camera or of the film drive and projection system to incrementally advance the film towards the takeup reel, by engagement of a pawl with the sprocket holes in the film 26, will momentarily loosen the film from engagement with the stationary snubber roll 67 and allow the slip clutch driving the takeup reel 68 to takeup that increment of the film advanced by the pawl. Between engagements of the pawl, the slip clutch prevents the takeup reel from advancing the film.

In the film drive and projection system, the snubber roll 67 is engaged only while the film is to be incrementally advanced onto the takeup reel. When the film is rewound onto the supply reel, the snubber roll 67 is disengaged and acts as an idler. As will appear, that may occur either during the processing of the film while rewinding, or during subsequent rewinding of the processed film after projection.

The film processing means, described in detail in the above-cited copending application Ser. No. 227,080, will next be briefly described, with reference to FIG. 10. As there shown, the apparatus generally comprises wall means comprising portions of, or formed integral with, the base plate 53 and the cover plate 56, which serve to guide, support and house the various elements of the processing apparatus to be described. These walls form an outer film composition containing housing generally designated 83, defining a chamber in which there is mounted an initially sealed container generally designated 84 of processing composition. The container 83 communicates with a coating nozzle generally designated 85. These elements are mounted above the plane of the film 26.

Principally located below, but in part surrounding, the film 26 is a pressure pad generally designated 86. The pressure pad is acted on by a spring generally designated 87.

The basic elements of the processing station further comprise a combined pressure pad deflection cam and nozzle closure valve member generally designated 88, and a pair of electrical contacts formed integral with the external terminals 63 and 64. The terminals 63 and 64 cooperate with the cam and valve assembly 88 in a manner to be described below to provide a signal indicating whether or not the film 26 has been processed.

More specifically, the outer container 83 comprises walls 89 formed integral with the floor plate 53 and extending upwardly therefrom in FIG. 10. The walls 89 and floor plate 53 form a container open on a side that is closed by a cover panel fragmentarily shown at 90 of the same general configuration as the region bounded by the walls 89 of the container 63.

The panel 90 is preferably put in place prior to assembly of the cover 56 with the base 53, and serves as a support for the top plate 56 after final assembly. As schematically indicated, the walls 89 are formed with an upper lug 91, and a lower ledge portion 92, in each of which are formed locating recesses 93 and 94, respectively, adapted to receive corresponding locating posts, not shown, formed on the inside of the cover panel 90 to aid in locating the panel 90 during its installation as the cover of the container 83.

The initially sealed container 84, mounted within the outer container 83, comprises a tub-like receptacle 95, of a suitable plastic or the like, selected to resist interaction with the processing composition, or permeation thereof by ambient gases. The receptacle 95 initially contains a charge 96 of processing composition in an adequate amount to process the film 26.

The receptacle 95 is formed on an open side with a circumscribing flange 97 adapted to fit into corresponding slots formed in the base plate 53 and the cover panel 56. As shown in FIG. 10, the flange 97 rests against a shoulder formed on the lug 91 at the upper end of the wall 89, and projects over the ledge 92 formed at the lower end of the wall 89.

The container 84 is sealed to initially contain the processing composition 96 by one end 98 of a tear-tab generally designated 99. The tear-tab 99 may be made of any suitable form of plastic material selected to resist the action of the composition 96, and to avoid interaction therewith, as well as to prevent the diffusion into the composition of gases such as oxygen, carbon dioxide, carbon monoxide, water, oxides or hydrides of sulfur or nitrogen, or the like, that might modify its composition. The end 98 is sealed to the plane surface of the flange 97 surrounding the opening formed in the receptacle 95, and within the flange area extending into the mounting recesses described above, by any suitable means such as heat sealing, by a suitable adhesive, or the like.

The tear-tab 99 extends from the end 98 sealed to the receptacle 95 back upon itself and out through an aperture 100 formed in the walls 89 to a processing composition release mechanism, not shown but described in detail in the above-cited copending application Ser. No. 227,080.

Outside of the sealed container 84, the walls 89 define a chamber 101 into which the processing composition 96 can flow when the tear-tab 99 is partially detached from the receptacle 95. The outer chamber 101 communicates with the coating nozzle 85 by way of a downwardly converging section 102 that communicates with a downwardly converging inlet passage formed in the nozzle 85.

The coating nozzle 85 may be formed in a conventional manner, as by precision molding or the like, from a suitable thermoplastic resin selected to form a dimensionally stable and accurate molding whose working surfaces can be kept to close tolerances. The most critical of these form a plane, generally U-shaped film engaging land 103 formed on the base of the nozzle, and a doctor bar 104, lying across the bend of the U-shaped land, and recessed from it as shown in FIG. 10.

The depth to which the doctor bar is recessed is greatly exaggerated in FIGS. 15 and 16; it is selected to be twice the desired thickness to which the coating composition is applied to the film 26. The film engaging land 103 and the doctor bar 104 circumscribe a generally rectangular outlet aperture formed in the nozzle and communicating with a downwardly converging passageway 106 through which the processing composition is received from the outer container 83, as described above.

The nozzle 85 is provided at the sides with posts 114 that provide guidance for the film in its path over the coating gap. These posts also serve at times to stop the nozzle closure plate portion of the element 88, to be described.

When engaged with the film in the manner to be described below, the film is adapted to pass over the nozzle outlet port and between the posts 114 with the emulsion side of the film in engagement with the land 103. During this engagement, coating takes place while the film moves, so that the emulsion surface leaves the coating aperture as it passes over the doctor bar 104 and carries with it a coating of processing composition established by the depth to which the bar 104 is recessed above the land 103.

The pressure pad 86 will next be described. The pressure pad is shown in FIG. 10 in the initial position assumed upon assembly of the cassette and prior to processing of the film 26.

As shown in FIG. 10, the film 26 normally passes below the nozzle 85, and above a normally disengaged film engaging pad surface 116. The pad surface is formed on an upwardly extending and generally rectangular protrusion in a base plate 117.

The pressure pad 86 may be made of any suitable conventional material, such as stainless steel or the like. The raised surface 116, formed by die stamping or the like, is ground or otherwise finished with a film engaging plane surface that is adapted to mate, through the film 26, with the plane of the land 103 of the nozzle and generally conform to the working area of the nozzle 85 confined between the land 103 and the doctor bar 104 and encompassing the rectangular opening through which the processing composition passes.

The pressure pad 86 is formed with an end 119 that is adapted to lightly engage the base side of the film 26 in the initial position shown in FIG. 10, for purposes to appear. Formed adjacent the end 119 on the plate 117, and extending upwardly therefrom, are a pair of ears 120 adapted to extend up past the film 26 on either side and to ultimately engage the underside of the nozzle 85.

The pressure pad 86 is formed at its other end with a pair of upstanding ears 121 formed integral with the plate 117 and extending upwardly past the film in FIG. 10 to engage a sloping ledge 122 formed in the lower side of an extension 123 of the walls 76 and 89. The extension 123 is formed integral with the base plate 53 and joins the wall 76 defining the projection aperture.

The ears 121 initially hold the film engaging surface 116 of the pressure pad out of engagement with the film. As will appear, the ears 121 of the pressure pad also serve at times as guides for the combined pressure pad depressing cam and nozzle closure plate member 88, to be described.

The base plate 117 of the pressure pad is divided to form a pair of legs 124 which are bent downwardly somewhat in the region of the ears 121 as suggested in FIG. 10. Between the legs 124 is formed a downwardly depending hook element 125 that initially serves as a detent to hold the pressure pad 86 in an inactive position in the housing. For that purpose, the hook 125 is engaged in the initial position shown by an upwardly bent end 126 formed at the end of the spring 87.

The spring 87 comprises a base portion 127 that is cut out to clear a bearing post 128 on which the idler roll 62 is journalled. The base portion 127 is further provided with a pair of mounting apertures in which suitable fasteners, shown as a pair of screws 129, can pass for securing the base 127 to the base plate 53. From the base portion 127 a resilient spring arm 130 extends, in planes normal to the base, into engagement with the film engaging portion of the pressure pad 86, and thence to its termination 126 initially engaged with the hook 125.

The pressure pad depressing cam and nozzle closure plate member 88 will next be described. The assembly 88 comprises a plane base plate 132 formed at one end 133 to cover the outlet port in the nozzle 85, in a manner to appear, to close the nozzle when the member 88 is moved into engagement with the nozzle at the end of the processing operation.

Formed as orthogonal extensions on the sides of the base plate 132 are a pair of cams 136 and 137 that serve at times to depress the pressure pad, described above, in a manner to appear below. The cam 136 is shorter than the cam 137, to facilitate threading of the film 26 during assembly of the cassette.

Toward the left end of the plate 132, the cam 137 is formed with a normally extending arm that extends generally parallel to the plate 132 and is formed with a pair of spring arm extensions 141 and 142. These arm extensions taper away from each other towards the ends, to allow entry of a film aperture in a manner to appear.

A central portion 143 is bent upwardly and away from leg extension portions 145 of the base plate 132, to form a hook having as its upper portion the extension 143 and as its lower portions the arms 145. These hook elements initially engage a ledge portion 146 formed integral with the base plate 53 to hold the assembly 88 in the position shown. In that position, the cams 136 and 137 extend into and are guided by the ears 121, and the nozzle closing plate end 133 of the assembly 88 confronts but does not engage a downwardly sloping guide ledge 147 formed on the wall extension 123 referred to above.

The upper spring arm 141, of the hook comprising that arm and the lower arm 142 formed on the assembly 88, lightly engages the base of the film 26 in the initial position of the parts shown in FIG. 10. The upwardly bent end of the arm 141 thus serves as a unidirectional detent that is adapted to engage the aperture 44 in the film, in a manner to be described below, towards the end of the processing cycle to be described.

The cam portion 137 of the assembly 88, of metallic conducting material, cooperates with the terminals 63 and 64 to form a signal generator indicating whether or not the film 26 has been processed. For this purpose, in the initial position of the parts shown in FIG. 10 assumed before the processing cycle is started, the cam 137 bridges the terminals 63 and 64, indicating to the film drive and projection apparatus, to be described, that the film is not processed.

At the end of the processing cycle, the assembly 88 will be carried to the right in FIG. 10, opening the circuit path between the terminals 63 and 64 to indicate that the film has been processed.

The tear-tab 99 extends out through the aperture 100 in the outer container 83 and thence over an idler 150 journalled for rotation in the housing by means schematically shown as a bearing post 152 formed integral with the base plate 53. The tear-tab 99 passes from the idler 150 to a tear-tab release mechanism, not shown, that is enabled by the insertion of a locating pin into the opening 16 and actuated by one of a set of teeth 151 formed on the flanges of the supply reel 57 when the supply reel is first rotated clockwise in FIG. 10 after the mechanism is enabled. The tear-tab release mechanism is fully shown and described in the above-cited copending application Ser. No. 227,080.

Having described one embodiment of the cassette of the invention, its operation will next be described in connection with FIGS. 1–11.

Referring to FIG. 10, it will be assumed that an initially unexposed strip of film 26 stored primarily on the supply reel 57 has been exposed in a camera, so that it has been advanced onto the takeup reel 68 to the exposure termination point determined by the first elongated sprocket hole 39 in the film (FIG. 4). The tear-tab 99 will be in the position shown in FIG. 10.

Next, assume that operation continues by the insertion of a locating pin into the port 16 of the cassette. As described in the above-cited copending application Ser. No. 227,080, entry of the locating pin will enable the tear-tab release arm to engage the teeth such as 151 formed on the supply reel 57.

Next, assume that operation is continued by further rotation of the takeup reel 68 counterclockwise, as seen in FIG. 10, to bring the film 26 farther onto the takeup reel. During this rotation, the supply reel 57 will move counterclockwise in FIG. 10, causing the teeth 151 to pass the tear-tab release arm without effective engagement therewith.

FIG. 10 shows the parts of the coating station in their initial position, which is maintained during exposure of the film and during a portion of the first increment of motion just described, from the exposure termination point toward the second termination point in which the film is substantially exhausted from the supply reel, and in which the second elongated sprocket hole 40 in FIG. 4 will be encountered. During the interval of travel between those positions, and prior thereto, the cam and nozzle closure plate assembly 88 is held in place by engagement of the arms 143 and 145 with the ledge 146, and the upper resilient arm 141 of the film engaging hook formed on the assembly 88 is lightly engaging the base of the film 26.

The pressure pad 86 is initially held in place by engagement of its hook 125 with the detent 126 formed on the spring 87. In that position, the end 119 of the pressure pad 86 lightly engages the base of the film 26, and the ears 121 are in engagement with the ledge 122 formed on the wall segment 123.

The parts of the coating station will remain in the position shown in FIG. 10 until, during the further advance of the film 26 towards the takeup reel, the film engaging hook 43 approaches and engages the end 119 formed on the pressure pad 86. When that occurs, near the second termination point established by the second elongated hole 40 in the film (FIG. 4), the hook 43 will move the pressure pad to the left in FIG. 10, to a position in which the ears 121 have moved out of engagement with the ledge 122, and upwardly under the influence of the spring 87. The ears 120 on the pressure pad 86 will come into engagement with the posts 114 forming a part of the nozzle 85, and the pressure pad 86 will swing up into engagement with the film 26 and carry the emulsion side of the film into coating engagement with the nozzle 85. If a pressure plate cleaning pad 46 is provided at the location shown in FIG. 4, it will sweep the pressure plate as the second termination point is approached and reached. However, the cleaning pad will perform no useful function at this time, unless there is dust or lint on the pressure plate to be removed.

As the pressure pad 86 is moved to the left, the detent 126 formed on the spring 87 will be disengaged by the hook 125. The purpose of the detent 126 is primarily to prevent premature movement of the pressure pad 86 in the housing prior to its positive disengagement from the initial position shown in FIG. 10 by the hook 43.

Next, assume that the first rewind operation is begun, by rotating the supply reel 57 clockwise in FIG. 10. As described in the above-cited copending application Ser. No. 227,080, this motion will bring the hook 43 out of engagement with the end 119 of the pressure pad. The pressure pad will now urge the film 26 into coating engagement with the nozzle 85 under the influence of the spring 87.

As the film 26 moves towards the supply reel 68, a pair of teeth 151 on the supply reel will engage the tear-tab release arm, detaching the tear-tab 99 in part from the receptacle 95 to allow the composition 96 to flow down into coating engagement with the nozzle and the film 26. Preferably, as described in the above-cited copending application Ser. No. 227,080, the rewinding of the film is interrupted briefly, to allow the composition to fill the nozzle, and then resumed. The composition will then be uniformly coated on the emulsion side of the film 26 to a thickness determined by the doctor bar 104.

A doctor bar coater is preferred to other conventional forms of coaters for the purpose of coating the film, because it is inherently insensitive to changes in the viscosity of the processing composition and to changes in linear film speed with respect to the doctor bar, over a reasonable range that makes the process relatively insensitive to these variables. In particular, as is well known in the art in other contexts, a doctor blade or doctor bar coater inherently will lay down a uniform coating of one-half the distance between the doctor bar and the coated substrate under conditions in which a uniform meniscus can be formed on the coating liquid adjacent its interface with the substrate.

The coating operation will continue until the composition 96 is substantially exhausted and the film is stored substantially all on the supply reel 68. Toward the end of that operation, the aperture 44 (FIG. 4) will approach and engage the hook finger 141 formed on the valve and cam assembly 88. During the coating operation, it will be apparent that no coated portion of the film passes through the film gate.

As the film 26 continues to move onto the supply reel, engagement of the aperture 44 in the film with the spring arm 141 will carry the film along the arm and downwardly, into the bight formed between the arms 141 and 142. Further movement of the film 26 towards the supply reel will carry the cam and valve member 88 to the right of the position shown in FIG. 10, causing the spring arms 143 and 145 to disengage the ledge 146, and bringing the cams 136 and 137 into contact with the base plate 117 of the pressure pad 86 in the region of the ears 121, with the cam assembly 88 being guided by the ears 121.

During this movement, the end 133 of the cam and valve assembly 88 is guided by the ledge 147 formed on the wall extension 111 of the housing, and moves below the nozzle 85 towards a nozzle closing position. The pressure pad 86 begins to move downwardly, out of engagement with the film 26. The film is still held down out of its normal plane of movement by engagement with the bight formed between the spring arms 141 and 142.

Movement in this direction will continue to move the assembly 88 to the right, as it goes to a final position in which the end 133 of the valve assembly 88 closes the nozzle 85 and shoulders formed on the assembly 88 engage the stops 114 formed on the nozzle 85. In that position, the cleaning pad 45 is still in the housing on the takeup reel side of the film gate.

During its movement from the position shown in FIG. 10 to the final position just described, the cam 137 disengages the terminals 63 and 64, and thus provides a signal indicating that the film has been processed.

When the film is again moved toward the takeup reel, as during projection of the processed film, the aperture 44 will disengage the arm 141, and the film will rise to its initial plane of movement, in which it is free of all of the elements of the processing apparatus, for subsequent cycles of projection and rewinding.

As described in the above-cited copending application Ser. No. 227,080, following a delay selected to permit the processing composition to affect all of the film uniformly, the film drive and projection apparatus will project the images just processed on a viewing screen while incrementally advancing the film onto the takeup reel.

The dual drive pawl in the film drive and projection system will advance the film past the first elongated sprocket hole 17. Film advance is terminated when the second elongated sprocket hole 18 is encountered.

Next, the supply reel 57 will be driven to rewind the film until the end of the film on the takeup reel is encountered. As the film is moved past the position in which it was stopped by the closing of the cam and valve member 88 at the end of the coating operation, the cleaning pad 45 will be moved through the film gate. As shown in FIG. 11, the pad 45 will sweep the aperture plate 7, absorbing any processing composition that may have been deposited during projection. The extra thickness of the pad 45, greatly exaggerated in FIG. 11, will be absorbed by lifting of the pressure plate 79 against its spring 79. The pad 45 may remain in the film gate at the end of the film motion, or pass through the gate to the supply reel side of the housing.

When the end of the film on the takeup reel is reached, as described in the above-cited copending application Ser. No. 227,080, the cassette will be ejected for retrieval by the user. The aperture plate will be left in clear condition for cooperation with the next cassette of processed or unprocessed film.

While the invention has been described with reference to the particular details of preferred embodiments, many changes and variations will occur to those skilled in the art upon reading this description, and such can obviously be made without departing from the scope of the invention.

What is claimed is:

1. A photographic cassette, comprising an opaque housing, means forming a film gate in said housing, takeup and supply reels rotatably mounted in said housing, a strip of film having ends connected to said takeup and supply reels and extending therebetween through said film gate, said film being initially unexposed and primarily coiled on said supply reel, said cassette being adapted to cooperate with a camera for selective exposure of portions of said film in said film gate as said film is advanced onto said takeup reel to an exposure termination position, processing means in said housing responsive to manipulation of said film in said housing following its initial advance from said supply reel toward said takeup reel to said exposure termination position to apply processing composition to said film as it is first rewound onto said supply reel to a process termination position, said cassette being adapted to cooperate with film drive and projection apparatus for sequential projection of portions of said film in said film gate as said film is advanced onto said takeup reel to a projection termination position beyond said exposure termination position, and to be rewound to a rewind termination position on said supply reel beyond said process termination point, and a cleaning pad of absorbent material mounted on said film in position to move through said film gate as said film moves from said process termination position to said rewind termination position.

2. A photographic film cassette comprising an opaque housing, means forming a film gate in said housing, supply and takeup reels rotatably mounted in said housing, an elongated strip of film having a first end connected to said takeup reel and a second end connected to said supply reel and extending therebetween over a path through said film gate, said film being initially unexposed and in a first position disposed primarily on said supply reel, processing means in said housing engageable with said film and operable when engaged to apply processing composition to said film as said film is moved onto said supply reel, first actuating means on said film adjacent said second end for engaging said processing means as said film is advanced onto said takeup reel to a position primarily on said takeup reel, second actuating means on said film adjacent said first end for disengaging said processing means as said film is rewound onto said supply reel to a position primarily on said supply reel, and an aperture plate cleaning pad of absorbent material mounted on said film between said first end and said second actuating means in position to pass into and be exposed in said film gate as said film is wound onto said supply reel beyond the position at which said processing means is disengaged by said second actuating means.

3. The apparatus of claim 2, in which said cleaning pad comprises a strip of flocked fabric.

* * * * *